(12) United States Patent
Davidson

(10) Patent No.: US 12,555,493 B2
(45) Date of Patent: Feb. 17, 2026

(54) SYSTEMS, METHODS, AND MANIPULATIVES FOR INSTRUCTION IN EXPONENTS AND LOGARITHMS

(71) Applicant: Financial Life Cycle Education Corp., New York, NY (US)

(72) Inventor: Andrew Davidson, New York, NY (US)

(73) Assignee: FINANCIAL LIFE CYCLE EDUCATION CORP., New York, NY (US)

( * ) Notice: Subject to any disclaimer, the term of this patent is extended or adjusted under 35 U.S.C. 154(b) by 1364 days.

(21) Appl. No.: 16/429,630

(22) Filed: Jun. 3, 2019

(65) Prior Publication Data

US 2020/0035126 A1  Jan. 30, 2020

Related U.S. Application Data

(60) Provisional application No. 62/702,509, filed on Jul. 24, 2018.

(51) Int. Cl.
*G09B 23/02* (2006.01)
*G09B 19/02* (2006.01)

(52) U.S. Cl.
CPC ............ *G09B 23/02* (2013.01); *G09B 19/02* (2013.01)

(58) Field of Classification Search
CPC .................................. G09B 23/02; G09B 23/04
USPC .................................................. 434/195, 205
See application file for complete search history.

(56) References Cited

U.S. PATENT DOCUMENTS

| | | | | | |
|---|---|---|---|---|---|
| 975,689 | A * | 11/1910 | Greenwood | ........... | G01B 3/004 235/70 C |
| 1,497,492 | A * | 6/1924 | Engel | ....................... | G06G 1/02 33/494 |
| 1,649,578 | A * | 11/1927 | Deming | ................. | G09B 19/02 434/196 |
| 2,494,497 | A * | 1/1950 | Trapnell | ................. | G09B 19/02 434/204 |
| 2,835,988 | A * | 5/1958 | Hilkene | ................ | G09B 19/02 434/195 |
| 2,899,757 | A * | 8/1959 | Webb | ...................... | G09B 19/02 434/204 |
| 2,926,432 | A * | 3/1960 | Helberg | ................. | G09B 19/02 434/196 |
| 3,229,388 | A * | 1/1966 | Smith | .................... | G09B 19/02 434/195 |

(Continued)

*Primary Examiner* — Kurt Fernstrom
(74) *Attorney, Agent, or Firm* — DAY PITNEY LLP; George N. Chaclas

(57) ABSTRACT

System and methods including a set of mathematical manipulatives that are designed to demonstrate the properties of logarithms and exponents are provided. A system that facilitates instruction in the logarithms, the system includes a set of manipulatives including at least one manipulative, each manipulative having a length proportional to a logarithm of a number labeled on the manipulative, the set of manipulatives are positionable end to end; and a measurement tool having markings for measuring a plurality of multiples of at least one manipulative; wherein, when one or more manipulatives are positioned end to end, a product of the numbers labeled on the manipulatives positioned end to end equals the number on a manipulative that has the same length as a total length of manipulatives positioned end to end.

17 Claims, 9 Drawing Sheets

(56) References Cited

U.S. PATENT DOCUMENTS

| | | | | |
|---|---|---|---|---|
| 4,144,657 A * | 3/1979 | Dumovich | G09B 23/02 | 434/195 |
| 4,778,390 A * | 10/1988 | Marans | G09B 19/02 | 434/187 |
| 5,297,965 A * | 3/1994 | Manancero | G09B 1/06 | 434/208 |
| 5,421,732 A * | 6/1995 | Taylor | A63F 3/0415 | 434/200 |
| 5,597,308 A * | 1/1997 | Woldenberg | G09B 19/02 | 434/195 |
| 5,683,252 A * | 11/1997 | Tsao | A63F 9/0098 | 434/208 |
| 5,746,001 A * | 5/1998 | Fisher | G09B 23/02 | 33/484 |
| 5,881,469 A * | 3/1999 | Monck | G09B 19/02 | 33/494 |
| 6,575,754 B2 * | 6/2003 | Salvo | G09B 19/02 | 434/207 |
| 6,609,712 B1 * | 8/2003 | Baumgartner | G09B 1/34 | 273/276 |
| 6,739,875 B1 * | 5/2004 | Lin | G09B 19/02 | 434/188 |
| 6,813,841 B1 * | 11/2004 | Ramsey | G01B 3/004 | 33/494 |
| 7,076,881 B1 * | 7/2006 | Perry | G01B 3/04 | 33/434 |
| 8,128,407 B2 * | 3/2012 | Brett | G09B 19/02 | 434/195 |
| 8,591,234 B1 * | 11/2013 | Ratcliffe | G09B 1/04 | 434/149 |
| 2007/0248939 A1 * | 10/2007 | Miller | A63F 3/0415 | 434/188 |
| 2010/0216101 A1 * | 8/2010 | Chung | G09B 19/02 | 434/188 |

* cited by examiner

SYSTEMS, METHODS, AND MANIPULATIVES FOR INSTRUCTION IN EXPONENTS AND LOGARITHMS

PRIORITY CLAIM

This application claims priority from U.S. Provisional Application No. 62/702,509 filed Jul. 24, 2018, which is hereby incorporated by reference in its entirety.

TECHNICAL FIELD

This disclosure relates generally to mathematics manipulatives that are designed to facilitate instruction in mathematics. In particular, this disclosure relates to systems and methods that facilitate instruction in exponents and logarithms.

BACKGROUND

Manipulatives have been developed to facilitate teaching of mathematics with the goal of transforming abstract concepts into physical objects that convey the essence of those concepts.

Although the underlying mathematical concepts of exponents and logarithms are not generally observable, they are important for many areas of mathematics, physics, and finance. Accordingly, there is a need for students to develop better understanding of these concepts.

SUMMARY

Logarithms and exponents are an especially challenging subject for students as they are generally not observable in everyday life.

As a result, students often memorize the rules for manipulating exponents and logarithms but do not gain an intuitive understanding.

The present disclosure relates to system and methods including a set of mathematical manipulatives that are designed to demonstrate the properties of logarithms and exponents. The present disclosure also provides a set of cylindrical manipulatives (LOGs) with lengths cut in proportion to the logarithm of specific number, and methods of instruction using the manipulatives described herein used to provide instruction in exponents and logarithms.

According to embodiments of the present disclosure, a system that facilitates instruction in the logarithms is provided. The system may include a set of manipulatives including at least one manipulative, each manipulative having a length proportional to a logarithm of a number labeled on the manipulative, the set of manipulatives are positionable end to end, and a measurement tool having markings for measuring a plurality of multiples of at least one manipulative. When one or more manipulatives are positioned end to end, a product of the numbers labeled on the manipulatives positioned end to end equals the number on a manipulative that has the same length as a total length of manipulatives positioned end to end.

In some embodiments, the system may further include a male connector and a female connector, the male and female connectors provide selective interlocking mechanisms between respective manipulatives positioned end to end. The male connector of a first manipulative may be connected to the female connector of a second manipulative.

In some embodiments, the markings of the measurement tool are multiples of a base manipulative, the base manipulative having a base manipulative length. The measurement tool may include a plurality of markings of multiples of a plurality of base manipulative lengths.

In some embodiments, at least one manipulative includes a plurality of manipulatives, each manipulative having a different length. In some embodiments, at least one manipulative includes a plurality of manipulatives, each manipulative having equal lengths. In some embodiments, at least one manipulative includes a plurality of manipulatives, including a base manipulative having a base manipulative length, each manipulative other than the base manipulative having a length proportional to the base manipulative length. The set of manipulatives may be stacked end to end vertically or horizontally.

According to embodiments of the present disclosure, a set of mathematical manipulatives to facilitate instruction in the logarithms is provided. The set of manipulatives may include at least one manipulative, each manipulative having a length proportional to a logarithm of a number labeled on the manipulative, the set of manipulatives are positionable end to end. When one or more manipulatives are positioned end to end, a product of the numbers labeled on the manipulatives positioned end to end equals the number on a manipulative that has the same length as a total length of manipulatives positioned end to end.

According to embodiments of the present disclosure, a method of instruction of logarithms is provided. The method may include providing a set of manipulatives including at least one manipulative, each manipulative having a length proportional to a logarithm of a number labeled on the manipulative, the set of manipulatives are positionable end to end, providing a measurement tool having markings for measuring a plurality of multiples of at least one manipulative; positioning two or more manipulatives end to end; multiplying the numbers labeled on the two or more manipulatives together to compute a product of the numbers labeled on the manipulatives positioned end to end that equals the number on a manipulative that has the same length as a total length of manipulatives positioned end to end.

The method may further include measuring the total length of the manipulatives positioned end to end using the measurement tool, wherein the markings of the measurement tool are multiples of a base manipulative, the base manipulative having a base manipulative length.

Additional features and advantages of the present disclosure will be set forth in part in the following detailed description, and in part will be obvious from the description, or may be learned by practice of the present disclosure. The features and advantages of the present disclosure will be realized and attained by means of the elements and combinations particularly pointed out in the appended claims.

It is to be understood that the foregoing general description and the following detailed description are exemplary and explanatory only and are not restrictive of the disclosed embodiments.

BRIEF DESCRIPTION OF THE DRAWINGS

The accompanying drawings, which comprise a part of this specification, illustrate several embodiments and, together with the description, serve to explain the principles disclosed herein. In the drawings.

DETAILED DESCRIPTION

The present disclosure may overcome the difficulties in learning and understanding logarithms by allowing subjects or students to work directly with physical objects that embody the concepts of logarithms. The present disclosure facilitates instruction in exponents and logarithms by creating a physical analog to the rules of exponents and logarithms. Exponents represent the number of times that the base number is multiplied by itself. For example, the expression: $2^3$ is equal to $2 * 2 * 2 = 8$. Logarithms are the inverse of exponentiation. Logarithm base 2 of 8 equals 3: $\log_2(8)=3$. More generally if $b^x=y$, then $\log_b(y)=x$. That is, the log base b of y is the exponent, x of b required to produce the result y.

As discussed herein, the logarithm of a number, N, is itself a number, and that number can be expressed as $\ln(N)$, $\ln(x)$ is the natural logarithm of x. If M is another number, the ratio $\ln(M)/\ln(N)$ determines the ratio of the lengths of the manipulatives. This disclosure provides a plurality of manipulatives with lengths determined by the ratio $\ln(M)/\ln(N)$ for a plurality of numbers, M. Each manipulative may be labeled with the number, M, that is used to determine its length. To construct the manipulatives a physical length is chosen for one manipulative and the other manipulatives may be produced with lengths proportional to the relative logarithms of the numbers.

For example, we can set the length of the LOG 10 to 5 inches. The length of LOG 100 would be 10 inches, because $\ln(100)/\ln(10)=2$. The length in inches of any LOG length LOG N would be $5*\ln(N)/\ln(10)$.

Note that due to the properties of logs it does not matter what base is used to compute the logs as long as the same base is used for the numerator and the denominator. This is an important insight that is often lost when logarithms are taught as the inverse of exponentiation using specific bases.

Figure 1:
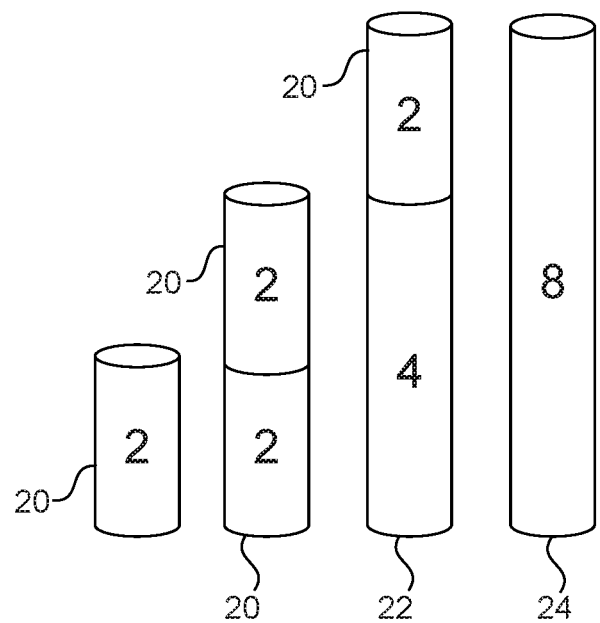
FIG. 1 is an illustration of labeling manipulatives (also referred to as LOGs) with powers of two (2), consistent with an example embodiment of the present disclosure.

FIG. 1 illustrates exemplary labeling of manipulatives 20 with powers of two (2), according to an embodiment of the present disclosure. As used herein the term "manipulative" may refer to any physical or virtual object, device, or material a subject or student can touch, move, arrange, stack, or otherwise handle in manner that may assist the subject or student in learning concepts. In some embodiments, as described below, the learning concepts may be mathematical concepts such as logarithms, exponents, and the like. Non-limiting examples of manipulatives in accordance with this disclosure are logs or log-shaped objects as will be described in more detail below.

The length of each manipulative 20 is a multiple of the length of manipulative 20 labeled with a "2". The manipulative 22 with the length equal twice the length of the manipulative 20 is labeled "4". The manipulative 24 with length equal to three times the manipulative 20 is labeled "8". A manipulative 25 with length equal to four times the manipulative 20 is labeled "16" (see FIG. 4).

When manipulative (e.g. manipulatives 20, 22, 24) are positioned or placed end to end, the product of the numbers labeled on the manipulatives equals the number on the manipulative which has the same length as the combined manipulatives. For example, FIG. 1 shows two manipulatives 20 stacked adjacent to manipulative 22, where the length of manipulative 22 is equal to the total length of the two manipulatives 20 stacked. Similarly, manipulative 20 is stacked on manipulative 22 adjacent to manipulative 24, and the total length of the stacked manipulative 20 and manipulative 22 is equal to the length of manipulative 24.

Figure 2:
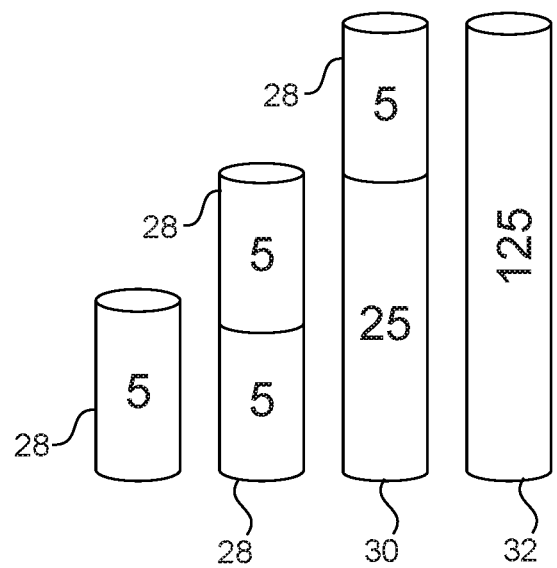
FIG. 2 is an illustration of labeling manipulatives with powers of five (5), consistent with an example embodiment of the present disclosure.

FIG. 2 illustrates the labeling of manipulatives 28 with the powers of five (5). The length of each manipulative is a multiple of the manipulative 28 labeled with a "5". The manipulative 30 with the length equal twice the manipulative 28 labeled 5 is labeled "25". The manipulative 32 with length equal to three times the manipulative 28 labeled 5 is labeled "125". For example, two manipulatives 28 stacked adjacent to manipulative 30, where the length of manipulative 30 is equal to the total length of the two manipulatives 28 stacked. Similarly, manipulative 28 is stacked on manipulative 30 adjacent to manipulative 32, and the total length of the stacked manipulative 28 and manipulative 30 is equal to the length of manipulative 32.

Figure 3:
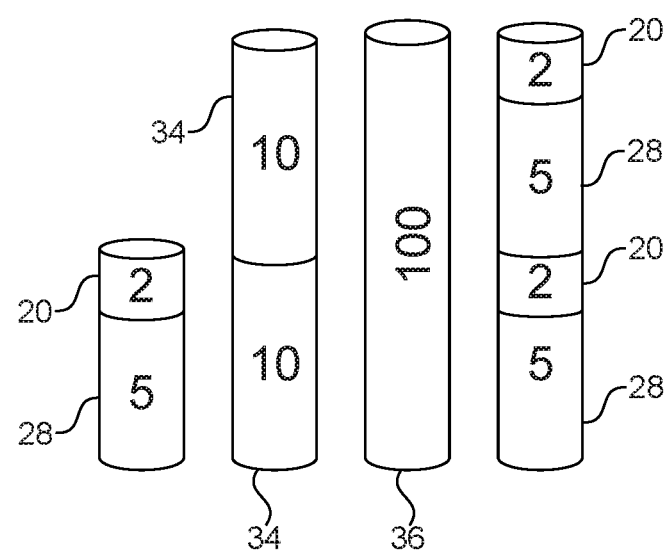
FIG. 3 is an illustration of labeling manipulatives with powers of two (2) and five (5), consistent with an example embodiment of the present disclosure.

FIG. 3 illustrates manipulatives of multiples of two different numbers. The ratio of the lengths of the manipulative 28 (power 5) and the manipulative 20 (power 2) equals the ratio: $\ln(5)/\ln(2)$. Additionally, FIG. 3 illustrates manipulatives 34 with powers of ten (10) including manipulative 36 which is labeled one hundred (100) which represents the logarithm of $10^2$.

In some embodiments, the manipulatives in FIG. 3 can be used to demonstrate log rules such as: $a* \ln(b)+c * \ln(d)=\ln(a^b * c^d)$. In this example $2 \times \text{LOG } 5 + 2 \times \text{LOG } 2 = \text{LOG } 100$, where LOG 5 is manipulative 28 and LOG 2 is manipulative 20. This is illustrated where manipulative 36 is placed adjacent to a stack of manipulatives including manipulatives 20 and 28 shown in FIG. 3.

Figure 4:
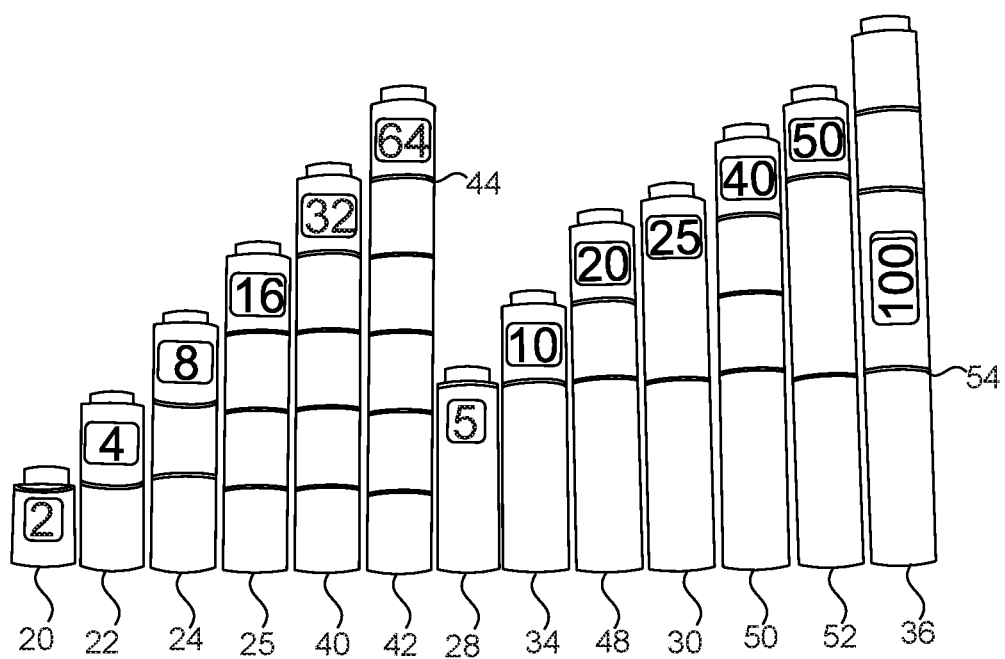
FIG. 4 is an illustration of a sample set of manipulatives using multiples of two (2) and five (5).

FIG. 4 shows a sample set of manipulatives using multiples of 2 and 5. In addition to manipulatives 20, 22, 24, and 25, a manipulative 40 with length equal to five times the manipulative 20 is labeled "32", and a manipulative 42 with length equal to six times the manipulative 20 is labeled "64". Manipulatives 22, 24, 25, 40, and 42 may each include a marking 44 for each length of manipulative 20. For example, as described above, manipulative 42 is six times the length of manipulative 20 and has five (5) markings 44. The markings 44 may be used to measure the length of the manipulative in relation to manipulative 20, which may be a base manipulative and also represents the logarithm of a prime number.

The set of manipulatives may further include manipulative 48 with a length equal to the sum of the lengths of two lengths of manipulative 20 and one length of manipulative 28, labeled "20". The set of manipulatives may include manipulative 50 having a length equal to three lengths of manipulative 20 and one length of manipulative 28, labeled as "40". The set of manipulatives may include manipulative 52 with a length equal to the sum of one length of manipulative 20 and two lengths of manipulative 28, labeled as "50". Manipulatives 34, 48, 30, 50, 52, and 36 may each include marking 44 for each length of manipulative 20 and/or a marking 54 for each length of manipulative 28. The markings 54 may be used to measure the length of the manipulative in relation to manipulative 28, which may be a base manipulative.

In addition to the proportional lengths and corresponding markings (e.g. markings 44, 54) of the manipulatives, measurement tools may be provided in accordance with embodiments of this disclosure. Additional components can supplement the LOGs.

Figure 5A:
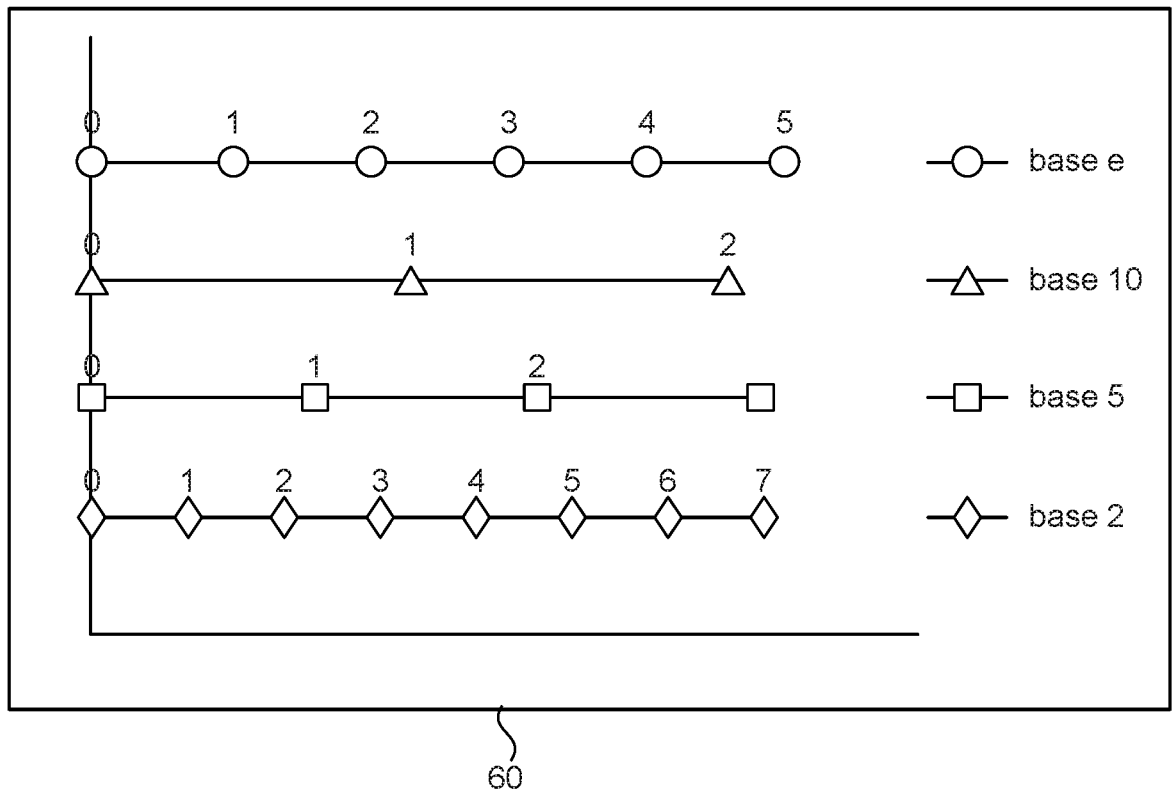
FIGS. 5A, 5B, and 5C show examples of measurement ruler used to count the number of manipulatives of a given length.
Figure 5B:
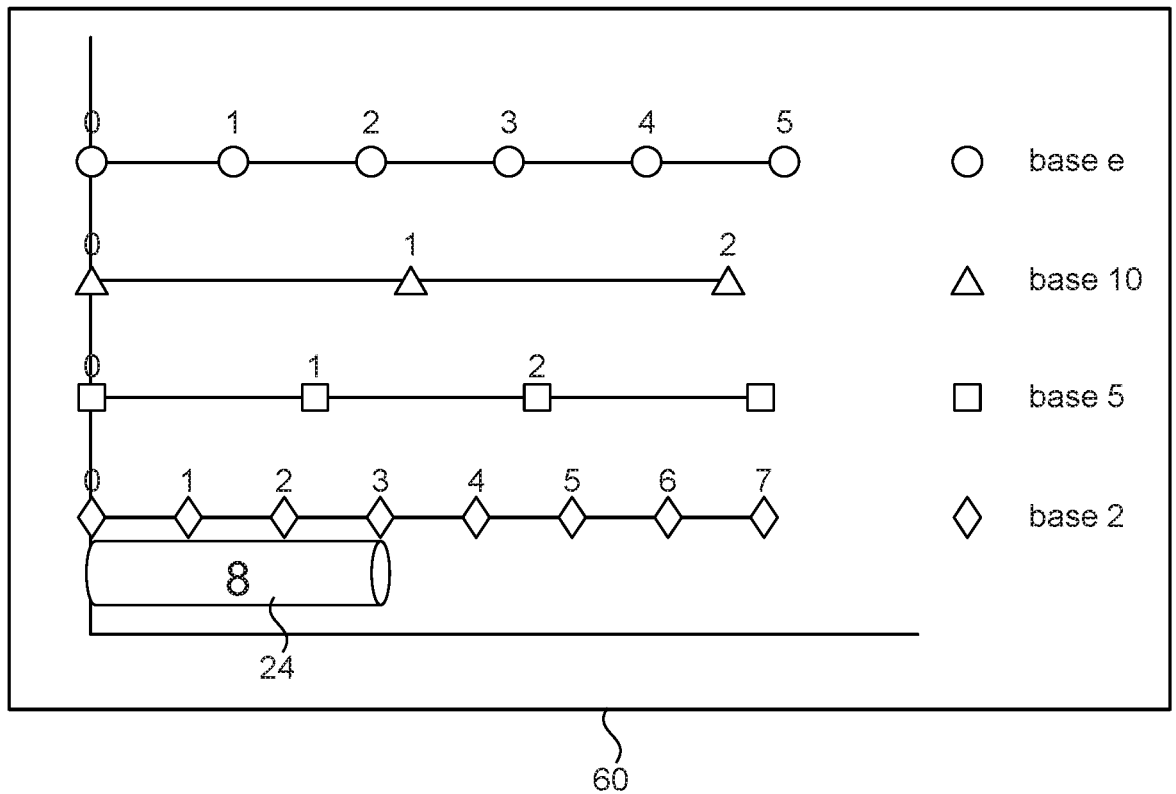

FIGS. 5A and 5B illustrate exemplary embodiments of measurement tool 60 used to count the number of manipulatives of a given length. The count represents the exponent or the power of that the base associated with the number represented on a manipulative of that length. For example, the manipulative 24 would have the same length of three manipulatives 20, labeled with the number "2". The number 2 raised power of three (3) equals eight (8), and logarithm base 2 of 8 equals 3. log2(8)=3 and equivalently $2^3$=8. Accordingly, manipulative 24 is positioned along the measurement tool 60 along the "base 2" measurement line, and manipulative 24 measures to the third measurement indicator. Additional measurement lines may be present on the measurement tool 60. Non-limiting examples of additional measurement lines may include a base 5 measurement line, a base 10measurement line, and a base e measurement line.

Figure 5C:
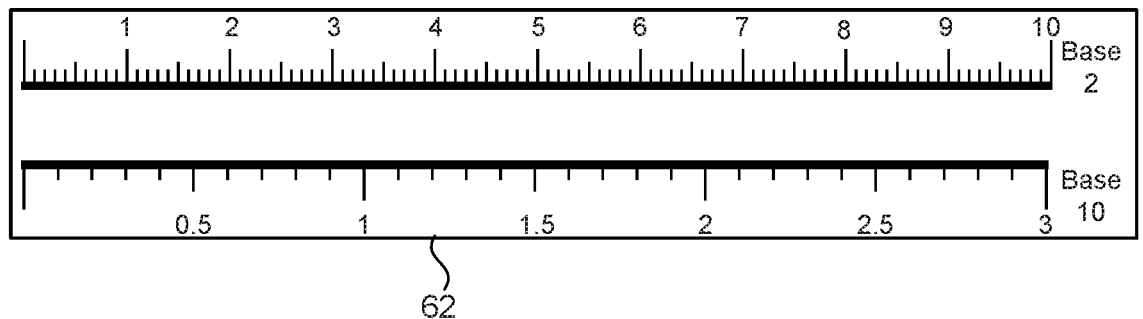

FIG. 5C illustrates an exemplary embodiment of measurement tool 62. Measurement tool 62 may have two measurement lines, a base 2 measurement line and a base 10 measurement line. Each measurement line may include a plurality of markings along the measurement line that provide for fractions or multiples of the base number that may provide for increased specificity in the measurement of manipulatives. The measurement tool 62 may include measurements using several different bases, that may facilitate instruction on how to convert between bases. The manipulatives and the measurement tool may teach transformation between bases is proportional based on the relative logarithms of the two bases.

Figure 6:
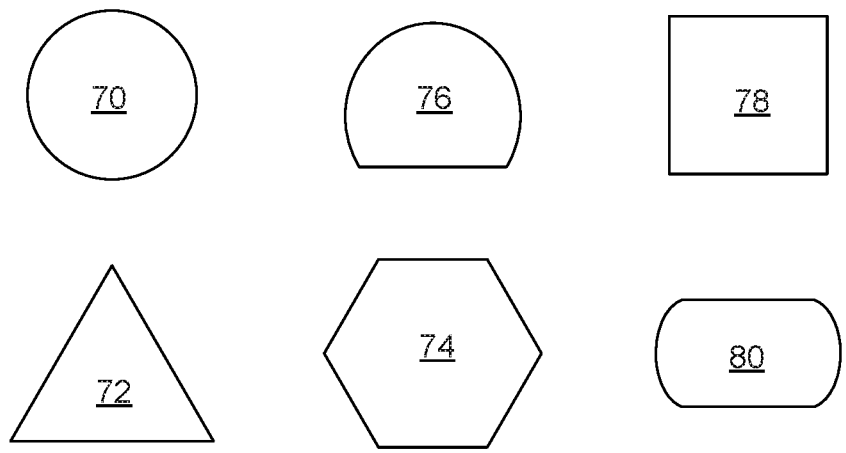
FIG. 6 illustrates a variety of cross-sectional shapes the manipulatives can be produced with, consistent with embodiments of the present disclosure.

FIG. 6 illustrates the manipulatives may be produced with a variety of cross-sectional shapes. For example, the manipulates described herein may be produced in any of the cross-sectional shapes shown, including but not limited to a circle 70, a triangle 72, a hexagon 74, a partial-circle 76 (may also be semi-circular), rectangular, square 78, pill-shaped 80, or any other appropriate shape. The manipulatives may be shaped in order to resemble a physical log (e.g. a log from a tree). For example, the log shape may accentuate the similarity of the word log used to describe a section cut from a fallen tree and the shortened version of the word logarithm. Therefore, a numerical label on the LOG that can be described as LOG N (i.e. manipulative N). In some embodiments, nearly two-dimensional manipulatives may be created on paper, plastic, or other material are other possible variations in cross section. The manipulatives may be designed to be stacked end to end vertically or placed end to end horizontally on a flat surface. The manipulatives may also exist as physical or virtual representations.

In some embodiments, the manipulatives may be produced in a plurality of textures and colors. In a non-limiting example, wood like textures and colors may accentuate the relationship between these manipulatives and the word logarithms. Other colors and textures may be used to differentiate manipulatives associated with different numbers and powers and multiples of that number.

Figure 7:
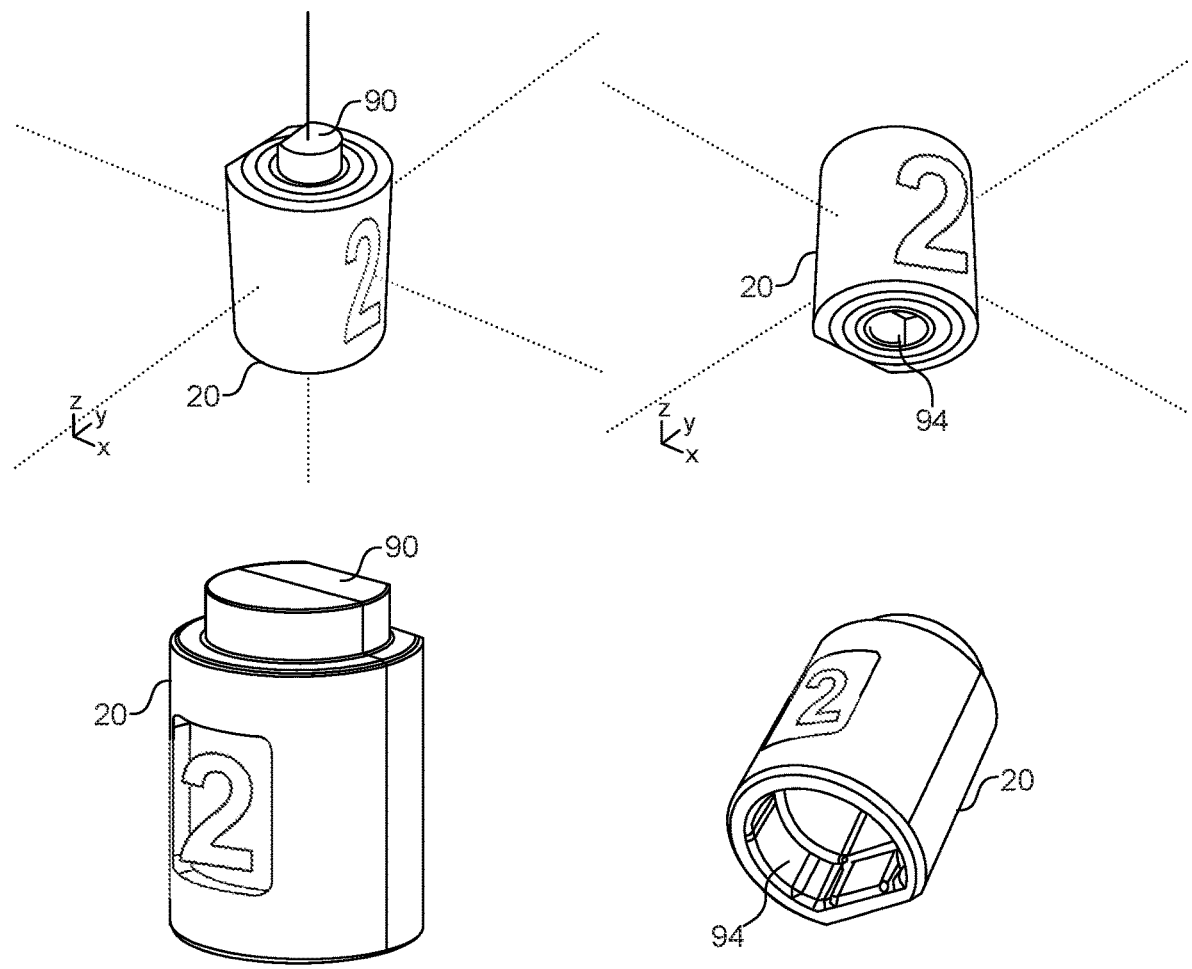
FIG. 7 shows example perspective views of interconnections between manipulatives, consistent with embodiments of the present disclosure.

FIG. 7 shows two examples of interconnections between manipulatives, according to some embodiments of the present disclosure. Manipulative 20 may include a male connector 90 and a female connector 94. The male connector 90 and female connector 94 may provide selective interlocking mechanisms between respective manipulatives positioned end to end. The male connector 90 may be dimensioned to be received by the female connector 94 such that the female connector 94 and the male connector 90 connect two manipulatives (e.g. manipulative 20) together. The male connector 90 and the female connector 94 may include an interlocking mechanism that includes an interference fit, a threaded connection, a barbed connection, a keyed connection, a friction connection, a magnetic connection, combinations thereof, or any other suitable mechanism for connecting two or more manipulatives together.

Additionally, the present disclosure may demonstrate how logarithms are related to powers. For example, two manipulatives with the same number end to end, have the same length as the square of the number, and three logs together have the same length as the cube of the number. FIG. 1 shows the powers of 2 created by stacking manipulatives 2 of length LOG 2, as described above.

Furthermore, the present disclosure may demonstrate how logarithms are used for multiplication. By putting two manipulatives end to end and finding a manipulative with the same length, or using the "measuring log", subjects or students can work with the principle that logarithms "convert" addition to multiplication. For example: log(a)+ log(b)=log(a*b). See for example in FIG. 3, manipulative 20 (LOG 2) and manipulative 28 (LOG 5) placed end to end have the same length as manipulative 34 (LOG 10).

In still other embodiments, the manipulatives may be used to perform division. For example, a manipulative (e.g. LOG Z), finding the length of the LOG, e.g. LOG X that needs to be combined with another LOG, e.g. LOG Y, so the total length of LOG X+LOG Y equals the length of LOG Z. In this example, LOG X is LOG Z−LOG Y, which implies that X=Y/Z.

The present disclosure may also instruct in squares and square roots using logarithms. The square of a number can be computed by stacking two manipulatives having the same number and finding the log with the same length. Since the logarithm of square is double of the logarithm of the number, the manipulative of the square root, must be one half the logarithm of the number. FIG. 2 shows an example where manipulative 28 (LOG 5) is one half the length of manipulative 30 (LOG 25).

Higher order powers and roots can be demonstrated similarly to squares, which the logarithm of each power is a multiple of length of manipulative of the number. The logarithm of higher order roots are also fractions of the manipulative of the number. For example, manipulative 20 (LOG 2) is one third the length of manipulative 24 (LOG 8), as seen in FIG. 1.

The invention can also be used to teach factoring. Using the "prime logs", that is those manipulatives based on prime numbers, the sum of the "prime logs" will equal the logarithm of the number. See for example FIG. 3, where the prime factors of 100 are 2, 2, 5, and 5.

An important concept in financial literacy is the "Rule of 72". This rule allows you to compute the time it takes for a person's money to double with compound interest. According to an embodiment of this disclosure, a set of manipulatives may be provided to demonstrate the "Rule of 72." These manipulative may be based on ln(1+r), where r is the interest rate, various interest rates may be used. The manipulatives may be compared to a "doubling manipulative" whose length is determined by ln(2). The number of LOG (1+r) required to equal the length of the doubling manipulative is the number of years to double your money. These manipulatives may be used to demonstrate that the Rule of 72 becomes less reliable as the interest rate r increases.

According to some embodiments, methods of instruction are also provided. The methods of instruction may support the details of the present disclosure to the mathematical principles of logarithms described above.

In some embodiments, a method of instruction of logarithms is provided. The method may include providing a set of manipulatives (e.g. manipulatives shown in FIGS. 1-7). The set of manipulatives may include at least one manipulative, each manipulative having a length proportional to a logarithm of a number labeled on the manipulative, and the set of manipulatives are positionable end to end. The method may further include providing a measurement tool having markings for measuring a plurality of multiples of at least one manipulative. The method may further include positioning two or more manipulatives end to end. The method may also include multiplying the numbers labeled on the two or more manipulatives together to compute a product of the numbers labeled on the manipulatives positioned end to end that equals the number on a manipulative that has the same length as a total length of manipulatives positioned end to end.

In some embodiments, the method may include measuring the total length of the manipulatives positioned end to end using the measurement tool (see e.g. FIGS. 5A-5C). The markings of the measurement tool may multiples of a base manipulative, the base manipulative having a base manipulative length.

The features and advantages of the disclosure are apparent from the detailed specification, and thus, it is intended that the appended claims cover all systems and methods falling within the true spirit and scope of the disclosure. As used herein, the indefinite articles "a" and "an" mean "one or more." Similarly, the use of a plural term does not necessarily denote a plurality unless it is unambiguous in the given context. Words such as "and" or "or" mean "and/or" unless specifically directed otherwise. Further, since numerous modifications and variations will readily occur from studying the present disclosure, it is not desired to limit the disclosure to the exact construction and operation illustrated and described, and accordingly, all suitable modifications and equivalents may be resorted to, falling within the scope of the disclosure.

Other embodiments will be apparent from consideration of the specification and practice of the embodiments disclosed herein. It is intended that the specification and examples be considered as example only, with a true scope and spirit of the disclosed embodiments being indicated by the following claims.

What is claimed is:

1. A system that facilitates instruction in logarithms, the system comprising:
   a set of manipulatives, each manipulative having a length proportional to a logarithm of a first base, wherein an argument of the logarithm is labeled on each manipulative, and the set of manipulatives are; positionable end to end; and include a plurality of lengths and corresponding arguments thereon so that the arguments on the manipulatives represent multiples of at least two numbers and products of the multiples;
   a measurement tool having a first measurement line with a plurality of equally-spaced markings for measuring the manipulatives, the measurement line representing a linear scale for the first base for reading an exponent for each manipulative, wherein the measurement tool has a rectangular shape with a length and a width, the length and the width of the measurement tool being large enough to accommodate a second measurement line for measuring the set of manipulatives, wherein the second measurement line represents a second linear scale for a second base of a logarithm, the second base being different from the first base;
   wherein: when two manipulatives are positioned end to end, a product of the arguments labeled on the two manipulatives equals an argument on a third manipulative that has a same length as a total length of the two manipulatives positioned end to end; the second measurement line has a plurality of equally-spaced markings sized and scaled to measure the set of manipulatives.

2. The system of claim 1, each manipulative further comprising:
   a male connector and a female connector, the male and female connectors provide selective interlocking mechanisms between respective manipulatives positioned end to end.

3. The system of claim 2, wherein:
   the male connector of a first manipulative is connected to the female connector of a second manipulative.

4. The system of claim 1, wherein:
   the markings of the measurement tool are multiples of a base manipulative, the base manipulative having a base manipulative length.

5. The system of claim 1, wherein:
   the measurement tool includes a plurality of markings of multiples of a plurality of base manipulative lengths.

6. The system of claim 1, wherein:
   at least one manipulative comprises a plurality of manipulatives, each manipulative having a different length.

7. The system of claim 1, wherein:
   at least one manipulative comprises a plurality of manipulatives, each manipulative having equal lengths.

8. The system of claim 1, wherein:
   the set of manipulatives are stacked end to end vertically.

9. The system of claim 1, wherein:
   the set of manipulatives are placed end to end horizontally.

10. The system of claim 1, wherein the equally-spaced markings on the second measurement line represent an exponent for the second base to yield the respective argument for any of the manipulatives read on the second measurement line.

11. A method of instruction of logarithms, the method comprising:
    providing a set of manipulatives including at least three manipulatives, each manipulative having a length proportional to a logarithm of a number labeled on the manipulative, the set of manipulatives are positionable end to end; and
    providing a measurement tool having a first and second measurement lines with a plurality of markings spaced at even increments along each measurement line for measuring at least one manipulative, the measurement line indicating a logarithm base, wherein the measurement tool has a rectangular shape with a length and a width, the length and the width of the measurement tool being large enough to accommodate at least two measurement lines, wherein the even increments differ between the first and second measurement lines;

positioning two or more manipulatives end to end on the first measurement line;

multiplying the numbers labeled on the two or more manipulatives together to compute a product of the numbers labeled on the two manipulatives positioned end to end that equals the number on one of the set of manipulatives that has a same length as a total length of the two manipulatives positioned end to end and a base of the logarithm raised to a power of a reading on the first measure line equals the product; and positioning the two or more manipulatives end to end on the second measurement line for a second reading indicating a power of a different base to equal the product.

12. The method of claim 11, further comprising:

measuring the total length of the manipulatives positioned end to end using the measurement tool, wherein the markings of the first measurement line are multiples of a base manipulative, the base manipulative having a base manipulative length.

13. A system that facilitates instruction in logarithms, the system comprising:

a measurement tool having a first measurement line for a first logarithm base with a plurality of equally spaced linear markings for consecutive exponents of the first logarithm base; and a plurality of manipulatives, each manipulative having a length proportional to a logarithm of an argument labeled on the manipulative, wherein the plurality of manipulatives are configured to be positioned end to end, wherein, when one of the plurality of manipulatives is positioned on the first measurement line to measure the length in consecutive exponents to acquire a first logarithm of the argument, the first logarithm base raised to a power of the first logarithm equals an exponential form of the number labeled on the one of the plurality of manipulatives, and when two or more of the plurality of manipulatives are positioned end to end on the first measurement line to read a second logarithm, a product of the exponential form numbers labeled on the two or more manipulatives equals the first logarithm base raised to a power of the second logarithm.

14. The system of claim 13, wherein the first logarithm base is two.

15. The system of claim 13, wherein the measurement tool has: a second measurement line for a second logarithm base with a plurality of equally spaced linear markings for consecutive exponents of the second logarithm base; a third measurement line for a third logarithm base with a plurality of equally spaced linear markings for consecutive exponents of the third logarithm base; and a fourth measurement line for a fourth logarithm base with a plurality of equally spaced linear markings for consecutive exponents of the fourth logarithm base so that one or more of the plurality of manipulatives may be measured when placed on any of the first, second, third and fourth measurement lines.

16. The system of claim 13, wherein the second, third and fourth logarithm bases are five, ten and e, respectively.

17. A system that facilitates instruction in logarithms, the system comprising:

a measurement tool having a first measurement line for a first logarithm base with a plurality of equally spaced linear markings representing consecutive exponents of the first logarithm base; and a plurality of manipulatives, each manipulative having a length proportional to a logarithm of an argument labeled thereon, wherein the plurality of manipulatives are configured to be positioned end to end, wherein, when one of the plurality of manipulatives is positioned on the first measurement line to measure the length thereof, a first resulting measurement is a logarithm of the argument, wherein the first logarithm base raised to a power of the first resulting measurement equals the argument labeled on the one of the plurality of manipulatives, and when two of the plurality of manipulatives are positioned end to end on the first measurement line to measure a combined length thereof, a second resulting measurement is equal to a logarithm of a product of the two arguments on the two manipulatives and the first log base raised to the second resulting measurement equals the product.

* * * * *